United States Patent
Kossira et al.

(10) Patent No.: US 9,665,524 B2
(45) Date of Patent: May 30, 2017

(54) METHOD AND DEVICE FOR COUPLING A FIRST SENSOR TO AT LEAST ONE SECOND SENSOR

(75) Inventors: Martin Kossira, Marbach am Neckar (DE); Jana Seidel, Marbach (DE); Alex Ruff, Weinsberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 414 days.

(21) Appl. No.: 14/346,441

(22) PCT Filed: Aug. 7, 2012

(86) PCT No.: PCT/EP2012/065420
§ 371 (c)(1),
(2), (4) Date: Jun. 18, 2014

(87) PCT Pub. No.: WO2013/041296
PCT Pub. Date: Mar. 28, 2013

(65) Prior Publication Data
US 2014/0297911 A1   Oct. 2, 2014

(30) Foreign Application Priority Data
Sep. 23, 2011   (DE) .................. 10 2011 083 254

(51) Int. Cl.
*G06F 3/00* (2006.01)
*G06F 13/28* (2006.01)
(Continued)

(52) U.S. Cl.
CPC ........ *G06F 13/4063* (2013.01); *H04L 12/403* (2013.01); *H04L 67/125* (2013.01)

(58) Field of Classification Search
CPC .................. G06F 11/3089; G06F 2203/04105
(Continued)

(56) References Cited

U.S. PATENT DOCUMENTS

2006/0192671 A1* 8/2006 Isenmann ............ G05B 19/042
                                                    340/531
2007/0195808 A1   8/2007 Ehrlich et al.
(Continued)

FOREIGN PATENT DOCUMENTS

DE    10 2009 029 217     3/2011
JP         2003150236 A   5/2003
(Continued)

OTHER PUBLICATIONS

International Search Report, PCT International Application No. PCT/EP2012/065420, dated Oct. 30, 2012.
(Continued)

*Primary Examiner* — Idriss N Alrobaye
*Assistant Examiner* — Getente A Yimer
(74) *Attorney, Agent, or Firm* — Gerard Messina

(57) ABSTRACT

A method for coupling a first sensor to at least one second sensor is provided, the method including a step of transmitting a first signal from the first sensor to the at least one second sensor. Furthermore, the method includes a step of providing a second signal by way of the second sensor. The second signal is provided in response to the first signal, the second signal representing a measured value of the second sensor. Furthermore, the method includes a step of outputting a third signal for a control unit by way of the first sensor. The outputting of the third signal is carried out in response to the second signal, the third signal representing at least one measured value of the first sensor.

13 Claims, 2 Drawing Sheets

(51) Int. Cl.
- *G06F 13/12* (2006.01)
- *G06F 13/38* (2006.01)
- *G06F 13/00* (2006.01)
- *G06F 13/40* (2006.01)
- *H04L 12/403* (2006.01)
- *H04L 29/08* (2006.01)

(58) Field of Classification Search
USPC .................. 710/260, 5, 24, 62, 100, 110
See application file for complete search history.

(56) References Cited

U.S. PATENT DOCUMENTS

| | | |
|---|---|---|
| 2009/0092112 A1 | 4/2009 | Kim et al. |
| 2009/0141741 A1 | 6/2009 | Kim et al. |
| 2009/0220830 A1* | 9/2009 | Limbeck ............ H01M 8/04231 429/441 |
| 2010/0118737 A1* | 5/2010 | Kim .................... H04L 12/4035 370/254 |
| 2010/0250911 A1* | 9/2010 | Trebbels ............. G05B 19/042 713/2 |
| 2010/0332706 A1* | 12/2010 | Hering ................ H03M 13/09 710/106 |
| 2011/0057236 A1 | 3/2011 | Feyh |
| 2011/0204876 A1* | 8/2011 | Mieth ................ G01N 27/286 324/120 |
| 2012/0317278 A1* | 12/2012 | Tamaki ................ H04L 1/0002 709/224 |

FOREIGN PATENT DOCUMENTS

| | | |
|---|---|---|
| JP | 2004077400 A | 3/2004 |
| JP | 2004226157 A | 8/2004 |
| JP | 2006268431 A | 10/2006 |
| JP | 2007122433 A | 5/2007 |
| JP | 2009140184 A | 6/2009 |
| JP | 2010166150 A | 7/2010 |

OTHER PUBLICATIONS

Zhou et al., "HDA: A Hierarchical Data Aggregation Scheme for Sensor Networks," *Computer Communications*, vol. 29, No. 5, pp. 1292-1299 (May 2006).

* cited by examiner

METHOD AND DEVICE FOR COUPLING A FIRST SENSOR TO AT LEAST ONE SECOND SENSOR

FIELD

The present invention relates to a method for coupling a first sensor to at least one second sensor, a corresponding device, and a corresponding computer program product.

BACKGROUND INFORMATION

To query conventional sensors via a bus system, the sensors are individually queried by a control unit. The sensors may also provide items of information in an unregulated way via the bus, which the control unit may input as needed.

For example, German Patent Application No. DE 10 2009 029 217 A1 describes an inertial sensor having a field-effect transistor, which includes a gate electrode, a source electrode, a drain electrode, and a channel area situated between the source electrode and the drain electrode. The gate electrode is stationary and the channel area is designed to be movable.

SUMMARY

Against this background, the present invention provides a method for coupling a first sensor to at least one second sensor, furthermore, a device which uses this method, and finally a corresponding computer program product. Advantageous embodiments result from the description below.

Independently of whether individual queries of items of information or a continuous provision of the information is/are carried out via a data bus, the bus is strained in both cases by a large amount of data communication, which may reduce a performance capability of the bus system. For example, a number of sensors in one branch of the bus may be limited by a transportable data quantity via the branch of the data bus. In addition, only one query may always be processed via a serial bus, whereby a second query must be carried out after the first query. A measuring point in time may thus shift from sensor to sensor. Measured values of the sensors no longer image a variable at the same point in time.

The present invention is based on the finding that one of the sensors of a system of sensors may assume administrative tasks to relieve the data bus. For this purpose, the sensor may communicate as a master sensor via an additional bus with slave sensors of the system. Commands on the additional bus may apply universally for all sensors or may be addressed to an individual sensor. The additional bus may be independent from the data bus. The additional bus may operate using a different communication protocol than the data bus. For example, the additional bus may use a simpler communication protocol.

In accordance with the present invention, a method is provided for coupling a first sensor to at least one second sensor, the method including the following steps:

transmitting a first signal from the first sensor to the at least one second sensor;

providing a second signal by way of the second sensor in response to the first signal, the second signal containing a measured value of the second sensor; and outputting a third signal to a control unit by way of the first sensor, in particular in response to the second signal, the third signal containing at least one measured value of the first sensor.

A sensor may be understood as a measured value sensor. For example, the sensor may be an inertial sensor. A signal may be a data word or a pulse. The signal may be designed for the purpose of transmitting an item of information. The signal may be addressed to an individual bus user or may apply or may be receivable for all bus users. The first signal and the second signal may be provided in different data formats. The first sensor may have at least two interfaces, the first interface being connected to the second sensor and the second interface being connected to the control unit. The second sensor may have one, two, or multiple interfaces, the second sensor also being able to be connected to the control unit. The first signal may be transmitted in response to a passage of a predefined time span.

The second signal may also be output to the control unit. The control unit may thus receive the measured values unchanged for analysis.

The second signal may be output to the first sensor, and the third signal may contain at least the measured value of the first sensor and the measured value of the second sensor. The first sensor may combine the signals of the sensors with its own signal (i.e., for example, it may link its own measured value to the measured value of the second sensor), to transmit a single signal to the control unit and to relieve the bus.

The third signal may be output time-delayed with respect to the second signal. Communication reliability may thus prevail on the data bus. The measured value of the second sensor cannot be corrupted by the measured value of the first sensor.

In the step of outputting, at least one further signal may be output, the at least one further signal containing an ascertained variable from the measured value of the first sensor and at least the measured value of the second sensor. The first sensor may continue processing the measured values. The first sensor may filter the measured values. For example, the measured values may first be provided if the measured values are greater than predefined criteria.

The method may have a step of plausibility checking, in which the measured value of the first sensor is checked for plausibility by way of at least the measured value of the second sensor and/or the measured value of the second sensor is checked for plausibility by way of the measured value of the first sensor. If comparable results are expected for the measured values, an error may be recognized in the event of an unexpected deviation of the results from one another. An outlier may thus be recognized in the measured values. A sensor defect may also be recognized.

The step of transmitting may be carried out in response to a query of the control unit, and in the step of transmitting, the measured value of the first sensor may be measured in response to the query. The third signal may furthermore be output in response to the second signal. A uniform measuring point in time may thus be established for all sensors. Time-critical measuring tasks may thus be reliably carried out simultaneously.

The first signal may have a different data format than the third signal. The first signal may also have the same data format as the third signal. The first sensor may have two identical interfaces. The third signal may have a greater bandwidth than the first signal. The third signal may be designed for the purpose of representing the measured value of at least the first sensor with high precision.

In the step of providing, the measured value of the second sensor may be detected and provided for transmission in response to the first signal, the transmission being carried out in response to a fourth signal of the first sensor. The data bus may thus be further relieved if the measured value is first retrieved when it is needed.

Furthermore, the present invention provides a device which is designed to carry out or implement the steps of the method according to the present invention in corresponding units. The object on which the present invention is based may also be achieved rapidly and efficiently by this embodiment variant of the present invention in the form of a device.

A device may be understood in the present case as an electrical device, which processes sensor signals and outputs control signals as a function thereof. The device may have an interface, which may be designed in hardware and/or software. In the case of a hardware design, the interfaces may be part of a so-called system ASIC, for example, which contains greatly varying functions of the device. However, it is also possible that the interfaces are independent integrated circuits or are made at least partially of discrete components. In the case of a software design, the interfaces may be software modules which are provided on a microcontroller in addition to other software modules, for example.

Also advantageous is a computer program product having program code, which may be stored on a machine-readable carrier, such as a semiconductor memory, a hard drive memory, or an optical memory and is used to carry out one of the above-mentioned specific embodiments when the program is executed on a computer or device.

BRIEF DESCRIPTION OF THE DRAWINGS

The present invention will be explained in greater detail hereafter as an example on the basis of the figures.

DETAILED DESCRIPTION OF EXAMPLE EMBODIMENTS

Figure 1:
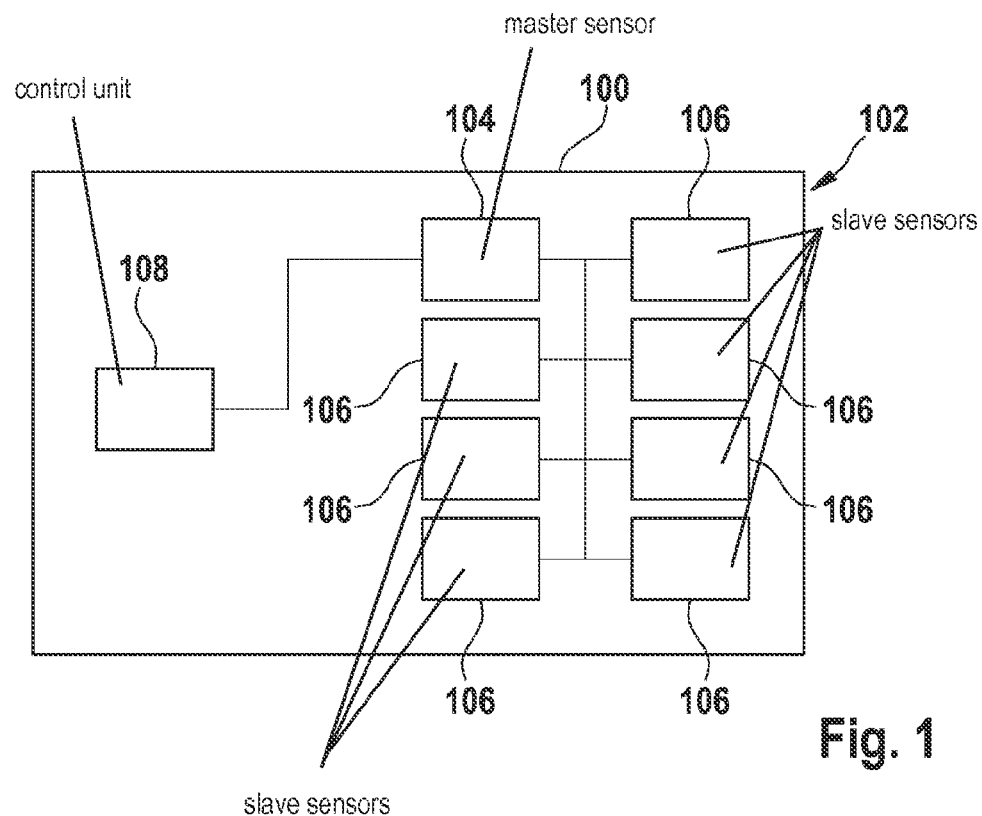
FIG. 1 shows a view of a vehicle having a sensor array for use according to one exemplary embodiment of the present invention.

In the following description of preferred exemplary embodiments of the present invention, identical or similar reference numerals are used for the elements which are shown in the various figures and act similarly, a repeated description of these elements being omitted.

FIG. 1 shows a vehicle 100 having a sensor array 102 including eight sensors 104, 106 according to one exemplary embodiment of the present invention. An item of information of sensor array 102 is used by a control unit 108. Sensors 104, 106 of sensor array 102 are connected to one another using a first data bus. One of sensors 104, 106 is connected as a master sensor 104 via a second data bus to control unit 108. The other sensors 106 are slave sensors 106. Master sensor 104 is designed for the purpose of transmitting a first signal via the first data bus to slave sensors 106. Slave sensors 106 are designed in this exemplary embodiment to provide a second signal in each case via the first data bus, after they have received the first signal. The second signal represents or contains in each case at least one measured value of particular sensor 106. Master sensor 104 is designed for the purpose of outputting a third signal via the second data bus for control unit 108 in response to a reception of the second signals via the first data bus. The third signal represents or contains in this exemplary embodiment at least the measured values of sensors 106 and a measured value of sensor 104. The third signal may also first be output when control unit 108 transmits a corresponding request signal via the second data bus.

Figure 2:
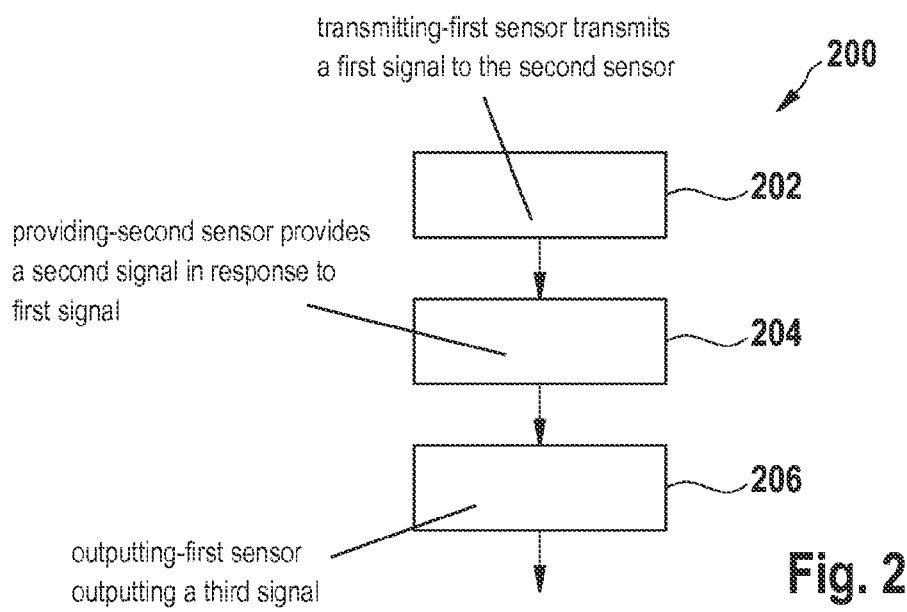
FIG. 2 shows a flow chart of a method for coupling a first sensor to at least one second sensor according to one exemplary embodiment of the present invention.

FIG. 2 shows a flow chart of a method 200 for coupling a first sensor to at least one second sensor according to one exemplary embodiment of the present invention. Method 200 may be executed on a sensor array as shown in FIG. 1. Method 200 has a step of transmitting 202, a step of providing 204, and a step of outputting 206. In the step of transmitting 202, the first sensor transmits a first signal to the second sensor or multiple sensors. The first signal may be understood as a trigger signal for a measuring point in time of the sensors. A measurement of at least one variable to be measured is triggered by the first signal in the second sensor or the multiple sensors and is imaged in a measured value. In the step of providing 204, a second signal, which represents or contains the measured value, is provided by the second sensor or the multiple sensors. The second signal may include one data word or multiple data words. The second signal is provided in response to receiving the first signal. A point in time of the provision may be delayed by a predetermined duration. The second signal may also be provided upon demand. The second signal may be retrieved individually with the aid of a further signal of the first sensor from each of the further sensors, for example. In the step of outputting 206, a third signal is output to a higher-order control unit by the first sensor. The third signal represents or contains at least one measured value of the first sensor. The third signal may include one data word or multiple data words. The measured value of the first sensor may have been detected at the same measuring point in time as the other measured values. The third signal may be kept ready for retrieval, and may be output in response to a command of the control unit. If the second signal of the second sensor or the multiple sensors has been received by the first sensor, the third signal may also represent or contain the measured values of the further sensors or the measured value of the second sensor. The first sensor may also continue processing the measured values. For example, the first sensor may carry out an error analysis of the measurements and suppress faulty measured values. The first sensor may also use the measured values to obtain at least one (indirect) parameter, which may also be represented in the third signal.

Figure 3:
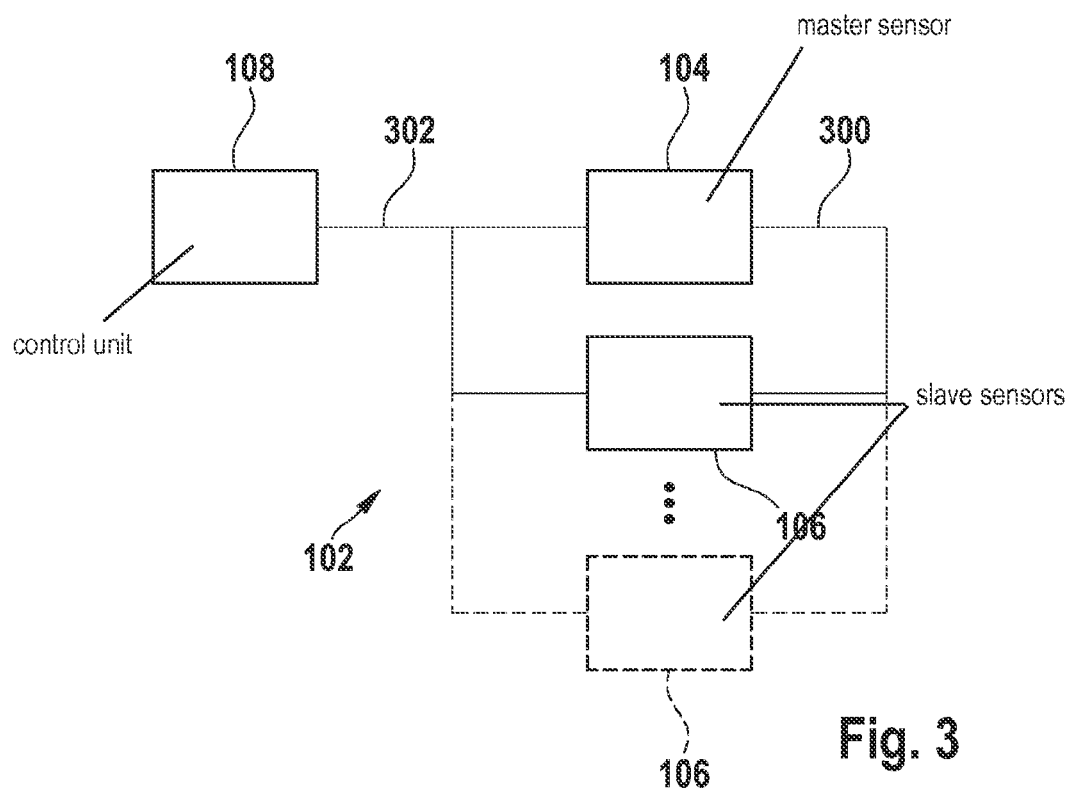
FIG. 3 shows a view of a sensor array according to one exemplary embodiment of the present invention.

FIG. 3 shows a view of a sensor array 102 according to one exemplary embodiment of the present invention. Sensor array 102 is designed for the purpose of carrying out a method for coupling a first sensor to at least one second sensor, as shown in FIG. 2. Sensor array 102 has, as shown in FIG. 1, a first sensor 104 as a master sensor. Furthermore, sensor array 102 has at least one second sensor 106 as a slave sensor. Sensor array 102 may, as shown here by dashed lines, have a plurality of slave sensors 106, which may be operated similarly to illustrated slave sensor 106. Slave sensor 106 and possible further slave sensors 106 are connected in this exemplary embodiment in parallel to master sensor 104 using first data bus 300 and second data bus 302, in contrast to FIG. 1. Second data bus 302 is connected to control unit 108. In this exemplary embodiment, the second signal is provided directly on second data bus 302 and may be received directly by control unit 108. First data bus 300 is only used here for the communication of sensors 104, 106 among one another. First data bus 300 may be an SPI bus, for example. Second data bus 302 may be a PSI or CAN bus, for example.

Figure 4:
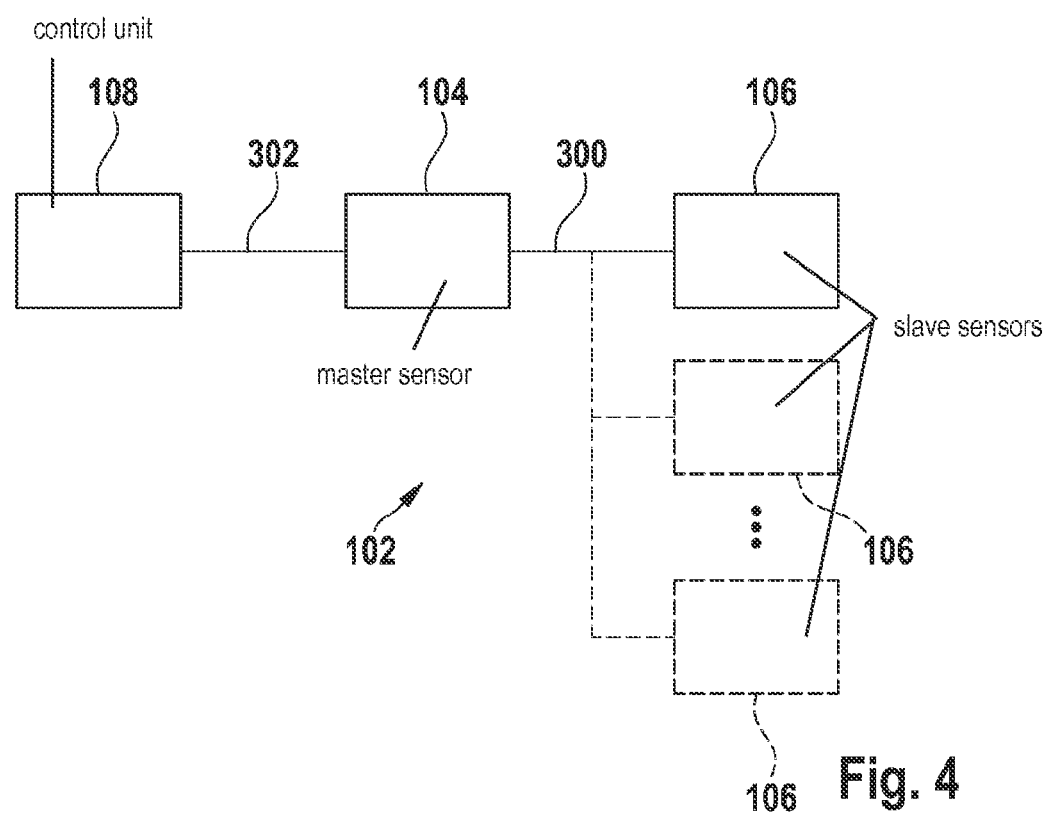
FIG. 4 shows a view of a sensor array according to another exemplary embodiment of the present invention.

FIG. 4 shows a view of a further sensor array 102 according to another exemplary embodiment of the present invention. Sensor array 102 is designed for the purpose of carrying out a method for coupling a first sensor to at least one second sensor, as shown in FIG. 2. Sensor array 102 has, as shown in FIG. 1, a first sensor 104 as a master sensor. Furthermore, sensor array 102 has at least one second sensor 106 as a slave sensor. Sensor array 102 may, as shown here by dashed lines, have a plurality of slave sensors 106, which may be operated similarly to illustrated slave sensor 106. Slave sensor 106 and possible further slave sensors 106 are connected in this exemplary embodiment in series via first data bus 300 to master sensor 104, as shown in FIG. 1. Second data bus 302 connects master sensor 104 to control unit 108. In this exemplary embodiment, the second signal is provided on first data bus 300. Master sensor 104 processes the measured values and provides the third signal via second data bus 302 for control unit 108.

FIGS. 1 through 4 show exemplary embodiments of a coupling of multiple sensors for the purpose of synchronization or data exchange according to various exemplary embodiments of the present invention. Slave sensors 106 shown here may be inertial sensors, for example, which are typically provided with a single interface (CAN, SPI, PSI, or the like), conventionally to communicate with a control unit—which processes its data. Sensors 104, 106 may also be configured as sensors which support two interfaces. For example, the CAN and SPI interfaces may be supported. Sensors 104, 106 may also support three interfaces. For example, the SPI, CAN, and PSI interfaces may therefore also be supported. Sensors 104, 106 may also have a programmable microcontroller core, whereby the implementation of the functionalities described here is made easier. In the approach provided here, one of these interfaces 300, 302 (for example, SPI interface 300) may also be used for the communication of sensors among one another. In the illustrated exemplary embodiments, the sensors are connected to one another via SPI. One sensor 104 acts as SPI master 104 and may communicate with other sensors 106, which operate as SPI slave 106. All connected sensors 104, 106 may thus act or react to one another jointly (as a cluster).

By synchronizing connected sensors 104, 106 among one another (triggered by SPI master 104), signal values in all participating sensors 104, 106 may be detected simultaneously (once, and also cyclically) to obtain consistent signal curves. Furthermore, the participating sensors may each communicate directly with the control unit, for example, via PSI; communication schemes are possible in this case which go beyond the possibilities provided in bus 302 itself. For example, time multiplexing may be implemented by alternate transmission in the same time window. Crosstalk, i.e., mutual interference of the signals, may thus be prevented. The communication to the outside (to control unit 108) may be carried out by two PSI transmitters in the asynchronous PSI mode (without sync pulse by control unit 108) if bus 302 does not offer a synchronization mechanism.

For data collection (in master sensor 104), it is possible to describe a sensor cluster 102. This means that only one of connected sensors 104, 106 communicates with the outside. This sensor 104 queries the data of other sensors 106 at these sensors and sends their signal values jointly with its own via the external interface to control unit 108. Sensors which only have one SPI interface may thus be incorporated without additional costs. Sensor cluster 102 (made of multiple connected sensors 104, 106) appears as an individual bus user.

In the case of a CAN bus, a simpler bus topology having only one CAN controller, one transceiver, one plug, etc., results. Lower piece costs and wiring costs result therefrom. In the case of a PSI bus, a reduction to only one transmitter results and synchronization of multiple transmitters is no longer necessary. Only one plug, etc., is necessary, which also results in lower piece costs and wiring costs. The data of multiple sensors 104, 106 may be sent jointly in the fewest possible messages. This results in less communication overhead and a lower busload. Simultaneous transmission of multiple simultaneously detected signal values is possible.

In the case of data fusion in master sensor 104, master sensor 104 may, in addition to the above-described possibilities for data collection, also process or analyze the collected data itself, to increase the data quality. Plausibility checking dependent signal values and/or calculating additional signals, for example, an angular acceleration from a detected yaw rate, is already possible in sensor cluster 102. Deriving new signals within the scope of model formation or a summary of multiple detected signals to improve the signal quality is also possible.

By way of the exchange of additional data, for example, of signal raw values, redundant processing in more than one of the participating sensors, and a final comparison, mutual monitoring of sensors 104, 106 and a significant increase of the resulting signal reliability may be achieved.

For the synchronization, master sensor 104 transmits a synchronization signal (typically cyclically) to all connected sensors 106, which receive this signal simultaneously, to provide a shared time base for actions to be synchronized (in all connected sensors 104, 106). On the receiver side (slave sensors 106), a synchronous action may be executed directly when the synchronization signal is received. One example would be parallel, synchronous signal value detection (while the collection of the detected values by master sensor 106 thereafter would be carried out sequentially).

Equalizing of the internal time base to the master sensor time base may also be carried out to prevent the various time bases from diverging. On the basis of the time bases—which are then synchronous—participating sensors 104, 106 may transmit their particular messages to control unit 108 at points in time adapted to one another. Time multiplexing (alternate transmission in the same time window) or two PSI transmitters in the asynchronous PSI mode (without sync pulse by the control unit) may be carried out as a mode.

The data collection (in master sensor 104) may be carried out by master sensor 106, which communicates with the outside. Sensor 104 queries the data of other sensors 106 and sends their signal values jointly with its own via the one external interface to control unit 108. The internal (between sensors 104, 106) and the external message and data formats may deviate from one another to achieve an externally uniform representation of the various signals.

In addition to the above-mentioned advantages, master sensor 104 may also carry out an initialization sequence to be externally controlled (from the slave sensor viewpoint) of other sensors 106, without this being visible at control unit 108. In the context of the data collection, master sensor 104 may also be used as a central memory (of sensor cluster 102) for equalizing data, which it transfers to other sensors 106 within the scope of the initialization or uses itself for the compensation of the input signal values of slave sensors 106.

The data fusion (in master sensor 104) requires a corresponding performance capability of master sensor 104, for example, in the form of a programmable microcontroller core. Therefore, in addition to the above-mentioned functions, plausibility checking of dependent signal values, calculation of additional signals, for example, angular acceleration from a detected yaw rate, derivation of new signals within the scope of model formation, and summary of multiple detected signals to improve the signal quality may already be implemented in the sensor cluster. Further functionalities may also be represented very flexibly based on the overall available signals.

By way of the exchange of additional data, for example, of signal raw values, redundant processing in more than one of participating sensors 104, 106, and final comparison, a significant increase of the resulting signal reliability may be achieved. The redundancy or monitoring may extend in this case, depending on the reliability requirements or concept, from the signal raw values up to the output to the control unit. Mutual monitoring is possible in both configurations (from FIG. 3 and FIG. 4).

The exemplary embodiments which are described and shown in the figures are only selected as examples. Different exemplary embodiments may be combined with one another in their entirety or with respect to individual features. One exemplary embodiment may also be supplemented by features of another exemplary embodiment.

Furthermore, the example method steps according to the present invention may be executed repeatedly and in a sequence different from that described.

If an exemplary embodiment includes an "and/or" linkage between a first feature and a second feature, this is to be construed that the exemplary embodiment according to one specific embodiment has both the first feature and also the second feature and according to another specific embodiment has either only the first feature or only the second feature.

What is claimed is:

1. A method for coupling a first sensor to at least one second sensor, the method comprising:
   transmitting a first signal from the first sensor to the at least one second sensor;
   providing a second signal via the second sensor, in response to the first signal, the second signal containing a measured value of the second sensor; and
   outputting a third signal to a control unit via the first sensor, the third signal containing at least one measured value of the first sensor;
   wherein the first sensor and the at least one second sensor form a sensor array,
   wherein an item of information of the sensor array is used by the control unit,
   wherein the first sensor and the at least one second sensor of the sensor array are connected to one another using a first data bus,
   wherein the first sensor is connected as a master sensor via a second data bus to the control unit, and wherein the at least one second sensor is a slave sensor,
   wherein the master sensor is configured to transmit the first signal via the first data bus to the slave sensor, and
   wherein the slave sensor is configured to provide a second signal in each case via the first data bus, after the slave sensor has received the first signal.

2. The method as recited in claim 1, wherein, in the providing, the second signal is output to the control unit.

3. The method as recited in claim 1, wherein, in the providing, the second signal is output to the first sensor, and the third signal contains at least the measured value of the first sensor and the measured value of the second sensor.

4. The method as recited in claim 1, wherein, in the outputting, the third signal is output time-delayed with respect to the second signal.

5. The method as recited in claim 1, wherein, in the outputting, at least one further signal is output, the at least one further signal containing an ascertained variable from the measured value of the first sensor and at least the measured value of the second sensor.

6. The method as recited in claim 1, further comprising:
   performing a plausibility check by at least one of: i) checking the measured value of the first sensor for plausibility via at least the measured value of the second sensor, and ii) checking the measured value of the second sensor for plausibility via the measured value of the first sensor.

7. The method as recited in claim 1, wherein the transmitting is carried out in response to a query of the control unit, and, in the transmitting step, the measured value of the first sensor is measured in response to the query.

8. The method as recited in claim 1, wherein the first signal has a different data format than the third signal.

9. The method as recited in claim 1, wherein, in the providing step, the measured value of the second sensor is detected and provided for transmission in response to the first signal, the transmission being carried out in response to a fourth signal of one of the first sensor or the control unit.

10. A device, comprising:
    a first sensor;
    a bus; and
    a second sensor, the bus coupling the first sensor to the second sensor via the bus, the first sensor to transmit a first signal to the second sensor;
    wherein the second sensor is configured to transmit a second signal in response to the first signal, the second signal containing a measured value of the second sensor,
    wherein the first sensor is configured to transmit a third signal to a control unit, the third signal containing at least one measured value of the first sensor,
    wherein the first sensor and the at least one second sensor form a sensor array,
    wherein an item of information of the sensor array is used by the control unit,
    wherein the first sensor and the at least one second sensor of the sensor array are connected to one another using a first data bus,
    wherein the first sensor is connected as a master sensor via a second data bus to the control unit, and wherein the at least one second sensor is a slave sensor,
    wherein the master sensor is configured to transmit the first signal via the first data bus to the slave sensor, and
    wherein the slave sensor is configured to provide a second signal in each case via the first data bus, after the slave sensor has received the first signal.

11. A non-transitory computer-readable storage medium having a computer program, which is executable by a processor, comprising:
    a program code arrangement having program code for coupling a first sensor to at least one second sensor, the program code, by performing the following:
      transmitting a first signal from the first sensor to the at least one second sensor;
      providing a second signal via the second sensor, in response to the first signal, the second signal containing a measured value of the second sensor; and outputting a third signal to a control unit by way of the first sensor, the third signal containing at least one measured value of the first sensor;

wherein the first sensor and the at least one second sensor form a sensor array, wherein an item of information of the sensor array is used by the control unit, wherein the first sensor and the at least one second sensor of the sensor array are connected to one another using a first data bus, wherein the first sensor is connected as a master sensor via a second data bus to the control unit, and wherein the at least one second sensor is a slave sensor, wherein the master sensor is configured to transmit the first signal via the first data bus to the slave sensor, and wherein the slave sensor is configured to provide a second signal in each case via the first data bus, after the slave sensor has received the first signal.

12. The method as recited in claim 1, wherein the second signal represents in each case at least one measured value of the slave sensor, and wherein the master sensor is configured for outputting a third signal via the second data bus for the control unit in response to receiving the second signal via the first data bus.

13. The method as recited in claim 12, wherein the third signal represents at least the measured values of the slave sensor and a measured value of the master sensor, and wherein the third signal is output when the control unit transmits a corresponding request signal via the second data bus.

* * * * *